Dec. 8, 1964  G. C. CHAPMAN ETAL  3,160,492
HEATED ORIFICE RING AND CONTROL THEREFOR
Filed March 23, 1960  4 Sheets-Sheet 1
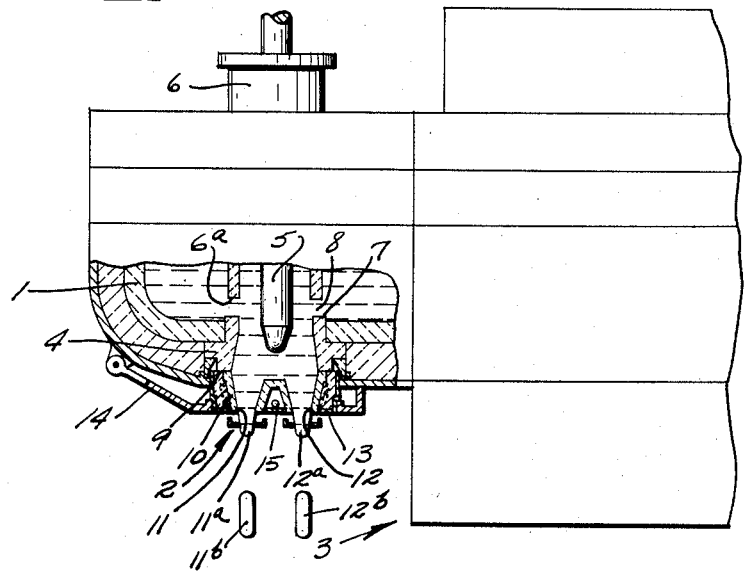
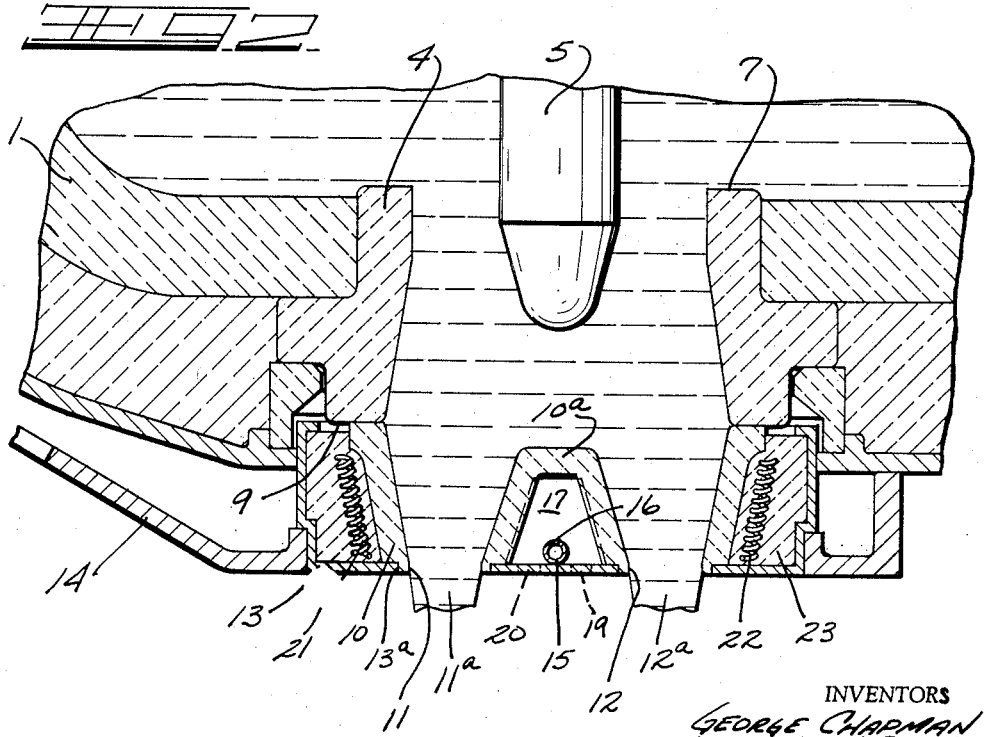
INVENTORS
GEORGE CHAPMAN
LAWRENCE V. PFAENDER
BY
D.T. INNIS &
J.R. NELSON
ATTORNEYS

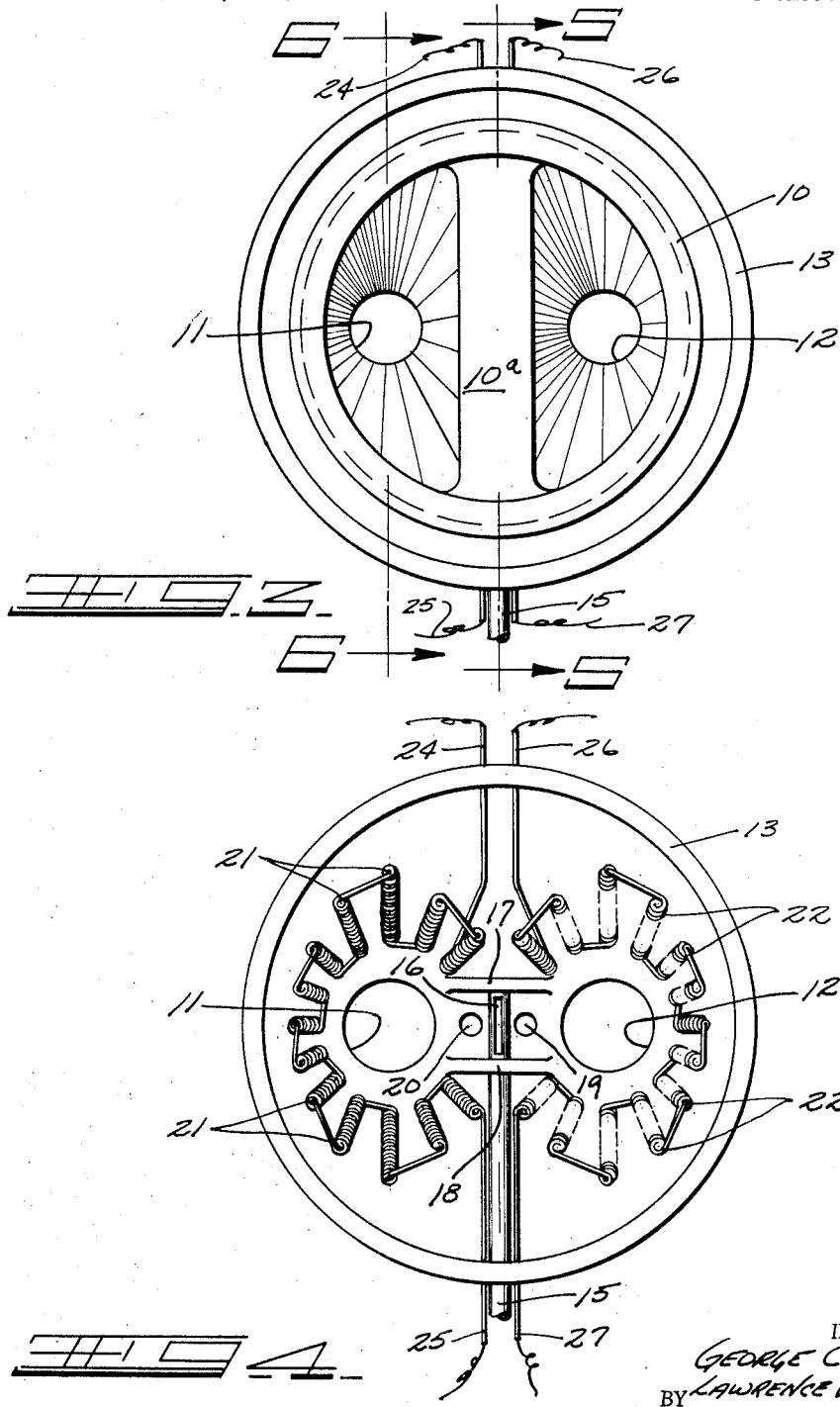

Dec. 8, 1964    G. C. CHAPMAN ETAL    3,160,492
HEATED ORIFICE RING AND CONTROL THEREFOR
Filed March 23, 1960    4 Sheets-Sheet 3
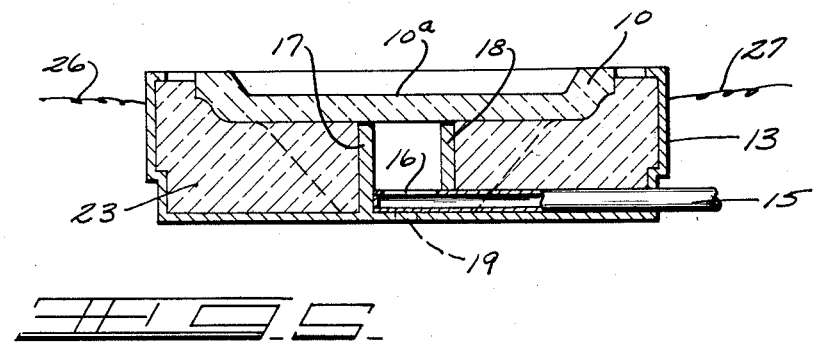
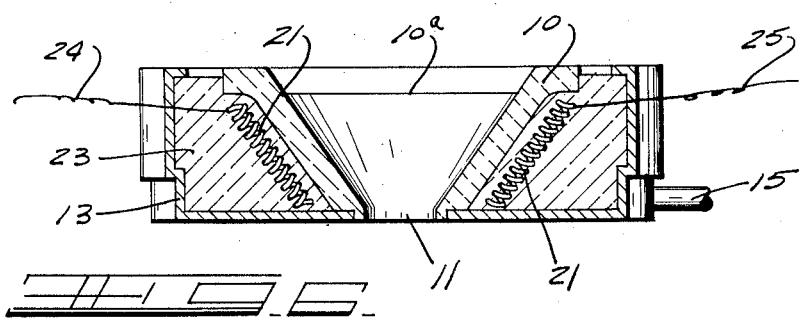
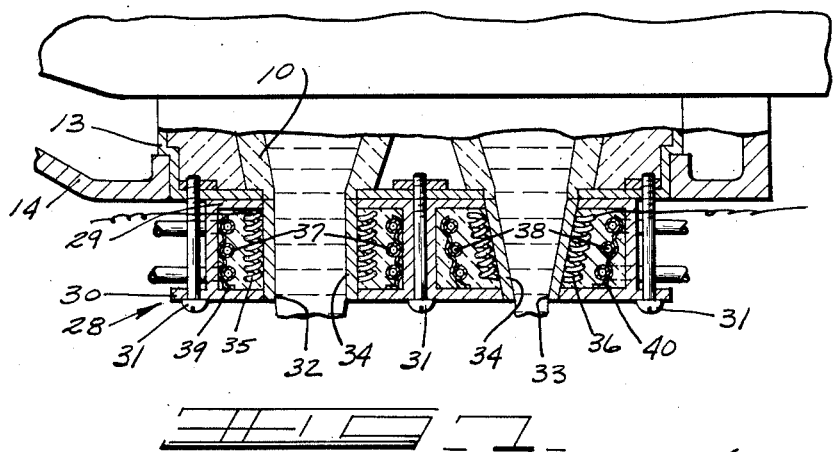
INVENTORS
GEORGE CHAPMAN
BY LAWRENCE V. PFENDER
D. T. INNIS &
J. R. NELSON
ATTORNEYS Dec. 8, 1964  G. C. CHAPMAN ETAL  3,160,492
HEATED ORIFICE RING AND CONTROL THEREFOR
Filed March 23, 1960  4 Sheets-Sheet 4
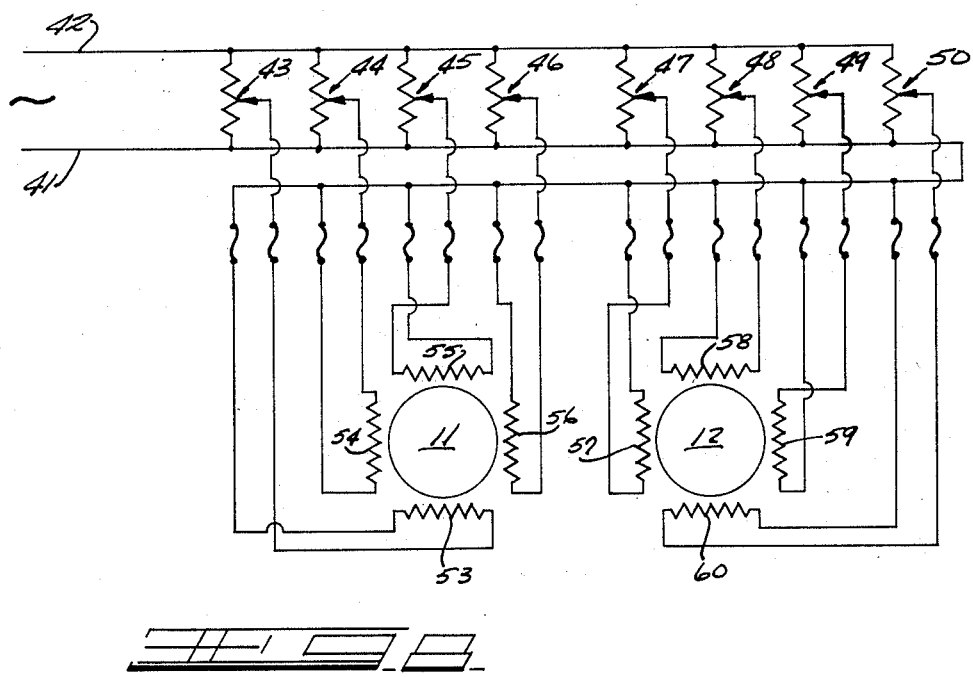
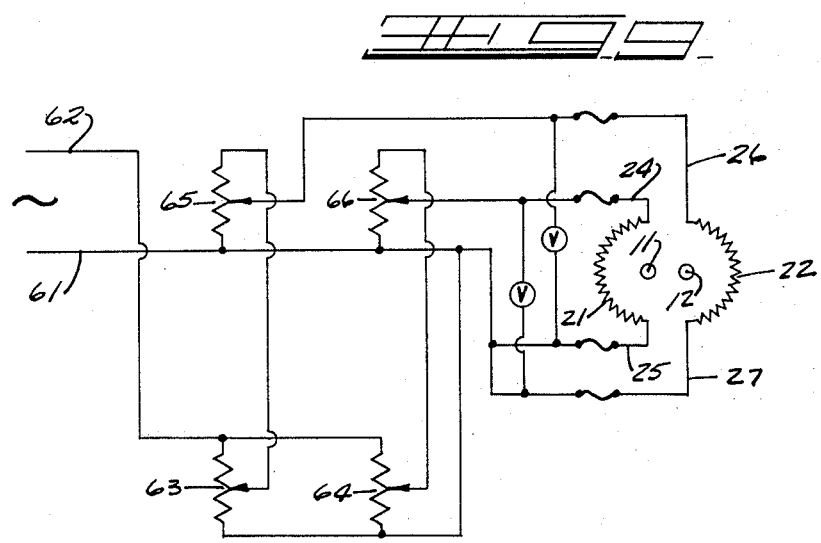
INVENTORS
GEORGE CHAPMAN
LAWRENCE V. PFENDER
BY
D. T. INNIS &
J. R. NELSON
ATTORNEYS

United States Patent Office 3,160,492
Patented Dec. 8, 1964

3,160,492
HEATED ORIFICE RING AND CONTROL
THEREFOR
George C. Chapman and Lawrence V. Pfaender, Toledo,
Ohio, assignors to Owens-Illinois Glass Company, a
corporation of Ohio
Filed Mar. 23, 1960, Ser. No. 17,079
2 Claims. (Cl. 65—128)

This invention relates generally to improvements in temperature control means and methods for use in conjunction with forehearth orifice structures from which a plurality of suspended molten glass mold charges may be discharged simultaneously. It relates more particularly to improvements in heating and cooling means for discharge orifices of glass feeders of the type having a well or support insert provided with a pair of orifice openings in its bottom evenly disposed about its vertical center line. The well is located in the floor of a feed bowl of a forehearth spout section so as to be continuously submerged by molten glass in the latter and the flow of glass to the well and through its openings is controlled by a vertical implement or implements depending into the glass above the openings in cooperative relationship with the well and by the selective control of thermally adjustable means associated with the discharge orifice openings. After glass is discharged through the orifice openings in the form of a generally cylindrical stream so as to be suspended from said openings, gobs or mold charges are formed by severing lengths of glass therefrom. Feeders of the above-described type are often known in the art as "double gob feeders."

The success of feeders of the double gob type depends, to a great extent, upon the simultaneous production of a pair of suspended molten glass mold charges having a pair of suspended molten glass mold charges having uniform weight, shapes and sizes. In commercially attaining uniformity of these factors, it has been found that many aspects of temperature control are of particular importance. It is desirable to have, if possible, at any one horizontal level a uniform radial gradient of temperatures about the center line of the well. It is also desirable to have a uniform radial gradient of temperatures at any horizontal level in the glass flowing through each discharge orifice opening. It is further desirable to have an equality of temperature conditions between both discharge orifice openings at the same corresponding levels.

It has been found in practice that uniformity of temperature distribution within the well is extremely difficult, if not impossible, to attain. Even if uniformity in the well were attained, a temperature gradient across both discharge orifice openings would normally result. The temperature gradient across either or both discharge orifice openings may be further accentuated by a non-uniform distribution of temperatures about the center line of the well.

Because of loss of heat by conduction through the retaining walls of the spout insert and orifice pan, the portions of each discharge orifice which lie adjacent to each other tend to have a higher temperature than do the sections of the discharge orifice openings which are remote from the center line of the spout insert. This lack of balance of temperature conditions within an orifice opening affects the viscosity of the glass flowing therethrough correspondingly and allows the glass closest to the center line of the spout insert to flow more freely than the glass in the more remote sections of the discharge orifice opening. This inequality of flow conditions may result in a lateral deviation of the suspended charges away from the vertical center line of the spout insert, the deviation being known in the art as "warping" or "curling."

The tendency of the suspended charges to warp or curl may be further accentuated by the drag encountered by the molten glass as it moves downwardly along the relatively cool walls of the spout insert to the portions of the orifice discharge openings remote from the center line of the spout insert.

This warping condition is undesirable in the operation of the feeder and may produce temperature inequalities in the glass of the gobs, such warping and temperature inequalities interfering with the formation and delivery of suspended charges best suited to their forming molds and for fabrication into glass articles.

A further consequence of temperature inequalities in the glass of the charges particularly with respect to the interface between the glass charge and orifice wall is the occurrence of devitrification at the interface. This is particularly true where the optimum working temperature of the glass is very close to the upper limit of the devitrification temperature range. In operating a feeder wherein the glass gobs are chilled by the relatively cool wall of the orifice opening, devitrification of the wall contacting glass may occur and during continued operation of such a feeder, the devitrified glass may be delivered with succeeding gobs resulting in formation of unsatisfactory ware.

It has been proposed to cool the zone between the orifices of a double orifice feeder to correct gob curl. While this arrangement may cure the gob curl problem, it results in restricting the mass rate of flow of glass through the orifices because of the excessive cooling of the gob-orifice interface, and furthermore will result in devitrification at the glass-orifice interface. The only way of again increasing the rate of glass flow through the cooled discharge orifices is to increase the total temperature of the molten glass in the spout insert. When the total temperature of the glass issuing from the orifices is increased, the speeds at which the parisons may be formed are decreased due to overheating of the parison molds.

It is an object of this invention to provide individually regulable temperature control means for independently controlling the surface temperature of the glass flowing through each individual discharge orifice opening of a glass feeder having a plurality of relatively adjacent orifice discharge openings.

It is a further object of this invention to provide heating and cooling means associated with double gob glass feeder discharge orifice structures which will alleviate the tendency towards warping of suspended glass charges accumulating beneath the discharge openings of such orifice structures.

A still further object of this invention is the control of the mass rate of flow of molten glass from one orifice, independently of the rate of flow from an adjacent orifice of a plural orifice feeder.

Another object of this invention is to increase the rate of production of glass articles through vernier control of gob weight and total temperature.

Another object of this invention is to provide heating means associated with double gob glass feeder discharge orifice structures which will alleviate the tendency towards warping of suspended glass charges as well as preventing devitrification of the glass contacting the orifice walls during discharge.

Another object of this invention is the provision of a heat exchange system that may be used to influence the rate of discharge of glass through a discharge orifice opening to regulate the shape, total temperature and weight of glass charges accumulating in suspension beneath the discharge orifice opening.

Additional objects and advantages of the present invention will become apparent in the course of the following description of several embodiments which are disclosed with particular reference to the accompanying drawings, in which:

FIG. 1 is a schematic vertical view, partially in cross-section of a double gob glass feeder, FIG. 2 is a schematic vertical cross-section view of a portion of a double gob glass feeder showing certain details of heating and cooling means of a type embodying the present invention, FIG. 3 is a top plan view of a double orifice member and orifice pan or casing of the invention, FIG. 4 is a top plan view of an orifice pan and showing the position of heater elements and cooling means therein, FIG. 5 is a vertical cross-sectional view taken along the line 5—5 of FIG. 3, FIG. 6 is a vertical cross-sectional view taken along the line 6—6 of FIG. 3, FIG. 7 is a schematic vertical view partially in cross-section of a second embodiment of the invention showing a temperature regulated adapter orifice for a double orifice feeder, FIG. 8 is a schematic wiring diagram for quadrant heating of double orifices, FIG. 9 is a schematic wiring diagram for the orifice heaters of FIG. 4.

Referring first to FIG. 1, a glass retaining spout or bowl 1, may be continually submerged by a pool of molten glass which may be supplied by a flow from a glass forehearth 3. Spout 1 is formed to define a spout insert or well 4 in its lower portion. A laterally adjustable and vertically reciprocable refractory plunger 5 depends during part of its vertical movement into the molten glass retained in spout insert 4. A laterally and vertically adjustable tube 6 may be rotatably suspended co-axially with plunger 5 above spout insert 4. A horizontal flat face 7 acts as the upper terminus of spout insert 4. Lower end 6a of tube 6 and flat face 7 are spaced apart vertically and form an annular flow passage 8 through which glass may pass to the spout insert. The molten glass is discharged from the spout insert under the influence of gravity and the reciprocating motion of plunger 5. The wall of the spout insert 4 has a lower horizontal face 9. Clamped in juxtaposition therewith is a refractory orifice ring or member 10. The refractory orifice member 10 is held in sealing engagement with face 9 of spout insert 4 by means of a clamping member 14.

The glass issues from the orifice member 10 as streams 11a and 12a conforming to the discharge openings 11 and 12. Mold charges, as gobs 11b, and 12b, are formed by timed reciprocating shears 2 which sever lengths from the streams 11a and 12a. These shears are timed with the reciprocation of plunger 5 in a conventional manner.

Orifice member 10 is formed to define two orifice discharge openings 11 and 12 in its lower portion. A pan or casing 13 surrounds and includes a seat 13a for orifice member 10 and aids in holding member 10 in juxtaposition with face 9. The clamping member 14 aids in positioning pan 13 and is instrumental in effecting the clamping of the orifice member to the spout insert structure in a manner capable of being quickly and easily disconnected.

Referring now to FIGS 2 to 6, one embodiment of the orifice member of the invention is shown in detail. The orifice member 10 is generally disc-shaped at its top portion and has two integrally formed, frusto-conical discharge orifice members depending therefrom. The frusto-conical members are joined together at their adjacent top portions by a horizontal web structure 10a which extends diametrically across the width of the orifice member 10. When the orifice member 10 is set in the pan 13, an open space is provided beneath the web structure 10a into which a conduit 15, having one end extending beyond the wall of the pan 13, extends into the center of the space beneath the web structure 10a to provide means for introducing coolant to the outside of the frusto-conical walls of the orifice member 10 in the zone between discharge orifices 11 and 12. A slot or elongated opening 16 is provided in the top surface of conduit 15 through which the coolant will pass and impinge on the exposed surfaces beneath the web structure 10a. The orifice pan 13 is provided with upstanding wall members or elements 17 and 18, which, in cooperation with the web structure 10a, define the length of the cooling zone between the orifices 11 and 12.

In order to provide continuous circulation of coolant through this zone, exit openings 19 and 20 are provided in the bottom of the pan 13 on opposite sides of the conduit 15. Thus the coolant, which is introduced through the conduit 15, will be exhausted to atmosphere through the exit openings 19 and 20. The orifice pan 13 which is adapted to receive the orifice member 10 is somewhat larger than the orifice member 10 thus providing a space between the outer wall of the orifice member 10 and the inner wall of the pan 13.

Electrical resistance type heating elements 21 and 22 located within the space between the orifice pan and orifice member, are positioned so as to substantially surround both the orifice openings 11 and 12. As best shown in FIGS. 2, 4, and 6, the heating elements 21 and 22 take the form of spirally wound resistance wires positioned in parallel relationship to the outer wall of the orifice member 10. The heating element 21 has power leads 24 and 25 connected to its ends which extend out through the orifice pan 13 to facilitate connection to a power source. Likewise, the heating element 22 has power leads 26 and 27 which extend out through openings provided in the pan 13.

A castable ramming mixture 23 having known thermal insulating properties fills the space between the orifice member 10 and the pan 13. The particular ramming mixture may be of any desired composition as long as its thermal insulating properties are known or can be calculated. The thermal conductivity of the mixture may be adjusted by changing the relative amounts of the various materials of which it is formed. In actual practice, when the completed heated orifice is first put into operation, the temperature of the glass issuing from the orifice will sufficiently heat the ramming mixture so that it becomes a fairly hard and cohesive mixture. In this manner the orifice member 10, after it has become worn through extended use or has improper size openings for a scheduled forming job, may be easily removed and replaced by a new orifice member without disturbing the heating elements 21 and 22 or the ramming mixture 23. This is particularly convenient in that it then becomes necessary to change only the orifice member itself without changing the pan and its insulation. Previously, when orifice members were changed, it was necessary to repack the insulation around the orifice members, and, thus it was extremely difficult, if not impossible, to reproduce the insulation properties of the old orifice in the repacked orifice. A further added advantage in having the insulation in the form of a castable ramming mixture is that a complete family of orifice members having orifice openings of graduated orifice sizes, but still having the same external contour and dimensions, may be easily interchanged without requiring a great number of orifice pans and without requiring repacking the insulation every time a different size orifice is used.

The operation of the above described heated orifices involves merely adjusting the amount of power applied to the heating elements surrounding the orifice member 10 so that the weight and shape of gobs issuing from the discharge orifices 11 and 12 may be controlled. In normal operation when the molten glass is flowing through the orifice member 10, there is a natural heat loss at the interface between the molten glass and the orifice member 10. This heat loss results in a cooling of the glass in contact with the surfaces of the orifices 10, causing the molten glass to become more viscous at the interface.

This cooling of the skin of the issuing glass results in a restriction of flow through the orifice openings 11 and 12. By providing an adjustable amount of heat to the orifice member 10, the viscosity of the glass at the interface between the glass and the orifice member may be decreased resulting in a greater rate of flow through the orifice and in an increase in weight of the gobs or charges being formed. This increase in gob weight is accomplished without raising the total temperature of the glass in the feeder.

Referring to FIG. 7, there is shown a cross-sectional view through a modified orifice structure which takes the form of an auxiliary pan generally designated 28. The auxiliary pan 28 is formed of two spaced-apart circular plates 29 and 30 joined to opposite ends of a cylinder to form an enclosure. The auxiliary pan may be used in conjunction with the electrically heated orifice 13, described above, or with the presently used orifice pans. The auxiliary pan 28 may be attached to the orifice pan by bolts 31 or other suitable fastening means.

The plates 29 and 30 of the auxiliary pan 28 each have a pair of aligned openings therethrough in which are mounted annular refractory elements 34 constituting discharge openings 32 and 33. The refractory wall elements or members 34 are surrounded by electrical heating elements 35 and 36. The electrical heating elements 35 and 36 are so positioned that their effective heat application will be parallel to their respective refractory elements 34, as illustrated in FIG. 7. This should be true whether the discharge openings are straight, as shown at 32, or frusto-conical, as shown at 33. Within the chamber defined by plates 29 and 30 are tubular cooling coils 37 and 38 which surround the electrical heating elements and are in parallel relationship thereto. The cooling coils are supported by a number of supporting elements 39 and 40 which take the form of strips of metal which may be fastened to the bottom wall 30 of the pan 28. The supporting elements extended generally vertically within the space between plates 29 and 30. In order to provide the desired spacing between successive convolutions of the cooling coils, they are fixed to the supports at spaced intervals therealong. A castable ramming mixture fills the remaining space between the plates 29 and 30 and serves as insulating means in a similar manner as the ramming mixture described above with respect to FIGS. 1 to 6.

While the above description of both embodiments has been limited to the situation in which a single heater is associated with each discharge orifice, it should be pointed out that the use of plural heater elements with individual control means may be advantageous in situations where "gob curl" is a problem. Each heater will effectively control the surface temperature of the issuing stream of molten glass along a portion of its total circumference. To correct any gob curl that may be encountered, it is merely necessary to apply additional power to the particular heater in the zone toward which the gob or stream is curling. This prevention of gob curl, by using separate power applications to zones surrounding each orifice of a double gob orifice ring, is considerably simpler than making the usual mechanical changes which are now required in order to straighten the gobs. Furthermore, electrical systems lend themselves to automatic control with greater ease than large mechanical systems.

Referring now to FIG. 8, there is shown a schematic wiring diagram for providing selective currents to resistance type heater elements wherein there are four elements 53, 54, 55 and 56 surrounding the discharge orifice 11 and four separate heating elements 57, 58, 59 and 60 surrounding the discharge orifice 12.

A suitable source of 110 v. alternating current is applied to all the heating elements through leads 41 and 42. A plurality of Variacs or potentiometers are connected across the power leads 41 and 42 and the variable voltage output of each potentiometer is fed to a single heater element. For example, potentiometer 43 is shown connected across the leads 41 and 42 and its output is connected to the heater element 53. By adjusting the wiper of the potentiometer 43, the voltage across heater element 53 may be adjusted as desired.

Likewise, potentiometers 44 to 50 control the amount of current flowing in heater elements 54 to 60, respectively. This particular circuit arrangement has special advantages from the standpoint of curing gob curl. For example, if glass is issuing from orifice 11 in such a fashion that there is curling toward the right, this would indicate that the right hand side of the discharge orifice is cooler than the remaining sides thereof. To straighten the gob, it would then be necessary to adjust the potentiometer 46 so as to increase the heat output of resistance element 56 which would result in an increase in temperature at that portion of the discharge orifice adjacent thereto and straighten the issuing gob. As can be readily seen, merely by selectively applying heat at the proper zone straight uniform gobs may be formed. The ability to adjust the skin temperature of a single gob in a double gob feeder is particularly advantageous, because gob curl does not necessarily occur in both orifices at the same time nor in corresponding directions.

With present practices of making mechanical adjustments to the feeder to correct gob curl, it is practically impossible to adjust one orifice without in some way influencing the other orifices.

Referring to FIG. 9, there is shown a schematic circuit diagram of the electrical connections to heaters 21 and 22 previously described with respect to FIGS. 1 to 6. A suitable source of alternating current connected to leads 61 and 62 supplies current to two Variacs or potentiometers 63 and 64 connected in parallel across the input leads. The output of the potentiometers 63 and 64 is fed to potentiometers 65 and 66 respectively, which in turn have their outputs connected through leads 24 and 26 to the heater elements 21 and 22. By providing two potentiometers in series for each heater element, it is possible to have manual control for setting up the base level of applied voltage and then utilize the second potentiometer to change the applied voltage in response to a measured condition. For example, potentiometers 65 and 66 might have their wipers adjusted in response to the output of thermocouples associated with the orifices 11 and 12 respectively.

With respect to the disclosure of FIGS. 8 and 9, which specifically show potentiometers as the adjustable control elements for the heaters, it should be kept in mind that Variacs or variable transformers can be used in place of the potentiometers. The utilization of Variacs or variable transformers would have some advantage over potentiometers when full power requirements for the heaters are necessary, for example when uncapping the orifice.

The particular arrangement of heater elements disclosed in FIGS. 1 to 6 in conjunction with the circuit of FIG. 9 has utility for controlling the weight of individual gobs being formed at the feeder.

Gob weight control using variable electric power is relatively simple yet is much more desirable and sensitive than adjusting the plunger movement or the mechanical compensations normally used to adjust gob weight in glass heat conditions. The fact that electric power input can also be controlled in response to the output of thermocouples positioned adjacent to the outer wall of the orifices, through a suitable controller, permits even better regulation.

It is further possible to provide control of the electric power input to the heaters in response to the press plunger movement within the press mold, which in effect is a gob weight indication. The control of power to the heaters can be in response to actual weight measurements of completed ware wherein the variations of ware weight from a preselected standard weight is utilized to adjust the amount of power being fed to the heaters. Furthermore, total power to the heaters associated with these orifices can be controlled through the interpositioning of a variable transformer or Variac in the power supply and thus the weight of gobs or mold charges issuing from both orifices can be changed by adjusting the overall power input to all the heater elements.

Since the discharge orifice wall temperature is basically the gob skin temperature, which, in turn, is the controlling flow regulating factor, a direct control of flow is possible.

An additional and highly important advantage obtained from electric orifice heating is that greater amounts of glass can be extruded through a fixed sized orifice without raising the total or body temperature of the glass charge being formed. It is required only to increase the power application to an orifice resistor, to increase the flow therefrom within limits. This, in effect, increases gob skin temperature and increases gob lubricity at the orifice. In essence, this means that because the mean gob temperature is not increased substantially, forming molds can be operated at higher speeds without overheating. Currently, the speed at which the molds overheat and tie up is the limiting factor in production rates of some jobs. Similarly, the same amount of glass can be obtained from a feeder orifice or orifice using a lower spout discharge temperature. This means that many jobs now being run with difficulty on some bottle machines due to high gob heat content and therefor with mold overheating problems, can now be accomplished with a reduction in gob mean heat content.

A further advantage attributed to electric heating of the orifice feeder structure is that devitrification of the glass at the interface between the issuing glass and orifice wall may be prevented. This is a particularly serious problem where the optimum operating temperature of the glass is only slightly above the temperature at which devitrification occurs. Thus by providing controlled heating and cooling in conjunction with the orifice outlets, it is possible to prevent devitrification or to prevent the accumulation of large amounts of relatively immobile glass within the orifice opening.

In presently existing orifice structures, when a feeder has been shut down and capped, the glass becomes frozen within the orifice opening and it is necessary, when uncapping, to stabilize the temperature conditions within the glass by applying heat for a period as long as five hours prior to obtaining useable mold charges from the feeder. By having electric heating elements surrounding the orifice opening, it is only necessary to apply full power to these heating elements and this will result in freeing the glass within the orifice opening and within a relatively short time the feeder will be feeding useable mold charges.

Additional advantages attributed to selective heating of individual discharge orifices of a double gob feeder includes the potential to form gobs of different weight at the orifice. Therefore, it is possible to make glass articles of different shapes and weight on two different machines that are fed from the same double orifice feeder.

The heater elements previously described and shown on the drawings take the form of spirally wound wires. It should be pointed out that the heater elements may either be open wire or strip construction, in spiral or corrugated stacks. The elements may be imbedded in a core of insulating ramming mixture formed in the pan or suspended in the pan with Sil-O-Cel or other powder insulation packed between the pan and the units. The heater elements themselves may be made of Kanthal, platinum, silicon carbide or other materials which operate at temperatures in the range of 2100° F.–2700° F. At the extreme end of this range, platinum is particularly advantageous and remains stable as a resistance heater element. The heating elements may be individually imbedded in a baked or granular electric insulating medium which may or may not have the metallic or ceramic jacket surrounding it for structural strength and insulating purposes.

It is obvious that the above described embodiments, while having been described as being used in the glass art, could be readily adapted to other industrial uses where the flow control of a viscous liquid through restricted openings is desirable.

Various modifications may be resorted to within the spirit and scope of the appended claims.

We claim:

1. The method of feeding glass in the form of double mold charges which comprises simultaneously flowing molten glass through a pair of discharge orifice members, insulating said orifice members against lateral heat flow, selectively applying heat to the outer walls of said orifice members, and selectively applying coolant to the adjacent walls of said orifice members, whereby the shape and size of the individual charges may be regulated.

2. Apparatus for feeding double gobs of molten glass comprising a forehearth containing molten glass having an opening in the bottom thereof, a pan having a continuous side wall and a bottom for closing said opening, said pan having a pair of openings in the bottom thereof, a member formed of heat resistant material having a pair of vertical tapered openings therethrough positioned within said pan, castable ramming mixture within and filling the space between said pan wall and said member, a plurality of generally vertically disposed heating coils imbedded in said ramming mixture and connected in series, said coils being spaced about the wall defining each vertical tapered opening in said member, conduit means extending through the side wall of said pan and terminating at a point between said orifices, means for supplying coolant to said conduit for cooling the adjacent walls of said member between said orifices, and means providing separate control to the heating means associated with each tapered opening, for selective regulation of the surface temperature of individual gobs, whereby weight and shape of the gobs, as between the pair of said openings, may be regulated.

References Cited in the file of this patent

UNITED STATES PATENTS

| | | |
|---|---|---|
| 1,622,666 | Peiler | Mar. 29, 1927 |
| 1,630,829 | Carpenter et al. | May 31, 1927 |
| 1,680,543 | Howard | Aug. 14, 1928 |
| 2,257,767 | Slayter et al. | Oct. 7, 1941 |
| 2,485,807 | Berthold et al. | Oct. 25, 1949 |
| 2,951,316 | Slayter | Sept. 6, 1960 |